Aug. 3, 1965 L. A. UPDEGRAFF 3,198,583
SOLIDS FLOW SYSTEM
Filed Dec. 18, 1963 2 Sheets-Sheet 1
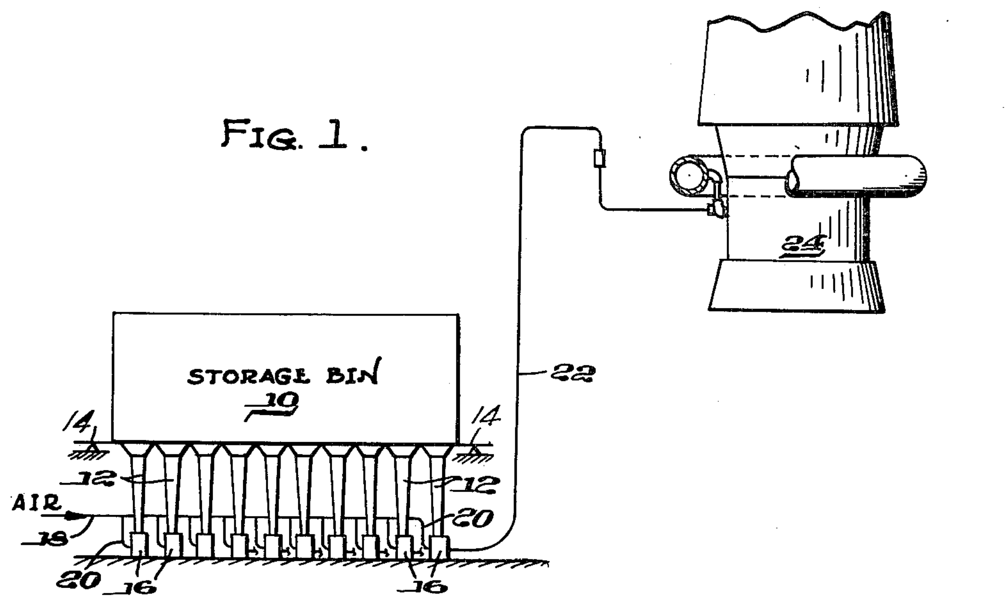
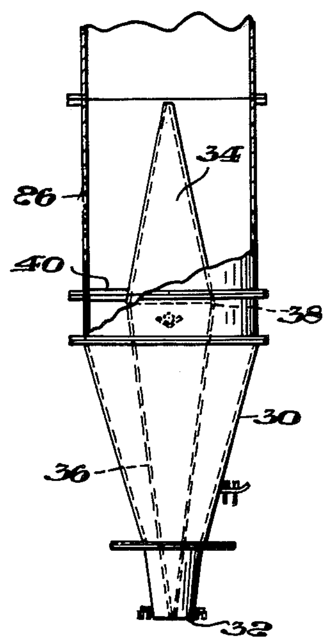
FIG. 2.
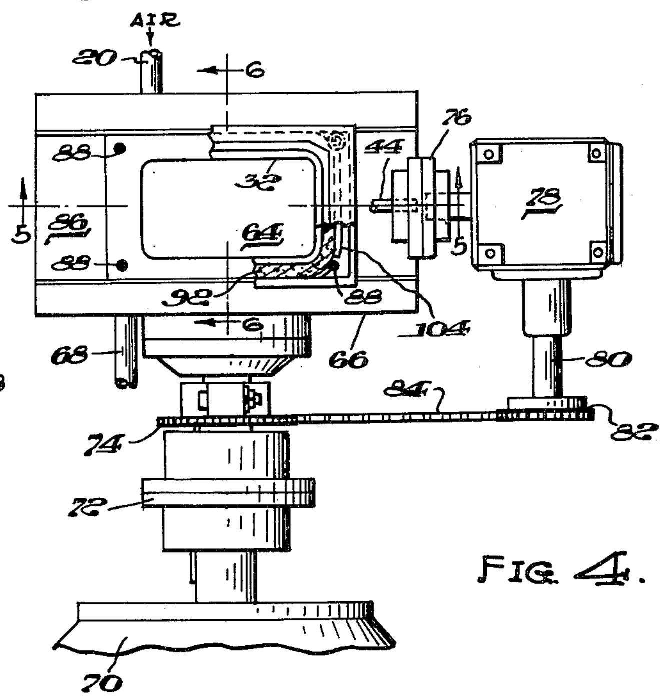
FIG. 4.
INVENTOR.
LOY A. UPDEGRAFF
BY Stanley Price
his ATTORNEY.

INVENTOR.
LOY A. UPDEGRAFF
BY Stanley J. Price
his ATTORNEY.

United States Patent Office 3,198,583

Patented Aug. 3, 1965

3,198,583

SOLIDS FLOW SYSTEM

Loy A. Updegraff, Worthington, Ohio, assignor to Koppers Company, Inc., a corporation of Delaware Filed Dec. 18, 1963, Ser. No. 331,591
4 Claims. (Cl. 302—17)

This invention relates to a solids flow system and more particularly to a solids flow system used in combination with a solids feed device for pneumatically transporting a fluidized mass of solid particulate material and air to a metallurgical furnace.

It has been proposed to supplement the presently used coke in the ore reduction process with a less expensive material such as pulverized coal or the like. A method has been found where the particulate material is admixed with air under pressure and the admixture is transported as a fluidized mass to the blast furnace tuyere zone where the particulate material is injected into the lower portion of the blast furnace. A rotary feeder device disclosed and claimed in copending application Serial No. 268,877, now Patent No. 3,178,235 and Serial No. 281,918, now Patent No. 3,178,237 is suitable for admixing the particulate material with the air for pneumatic transport to the blast furnace.

The particulate material is fed to the rotary feeder solids inlet from a bin positioned thereabove. The bin is at atmospheric pressure and the particulate material is dependent on gravitational forces for continuous downward flow from the bin to the rotary feeder solids inlet.

It has been discovered that a portion of the air fed to the rotary feeder to convey the particulate material to the blast furnace tuyere zone leaks upwardly through the solids inlet and opposes the gravity flow of the particulate material from the bin into the rotary feeder solids inlet. The pressure of the air fed to the rotary feeder of necessity must be greater than the pressure existing at the hot blast main of the blast furnace. For example, the pressure of the air fed to the rotary feeder is between 35 p.s.i.g. and 70 p.s.i.g. A portion of the air fed to the rotary feeder leaks around the moving parts in the rotary feeder and exhausts through the solid feet inlet. This air leakage causes a back pressure to be exerted on the particulate material fed by gravity to the rotary feeder solids inlet. This back pressure interferes with the smooth gravity flow of the particulate material from the bin to the rotary feeder solids inlet.

The rotary feeder is a type of positive displacement pump and the rate the particulate material is discharged from the rotary feeder is determined by the r.p.m. of the rotor within the rotary feeder. It is necessary for accurate metering of the particulate material fed to the furnace to periodically check the efficiency of the rotary feeders.

The bins above the rotary feeders are positioned on suitable weigh cells that are used to periodically measure the rate of removal of particulate material from the bins during the operation of a rotary feeder. The bins are arranged to move vertically as the volume of particulate material therein is changed. The rotary feeders are rigidly secured to a suitable foundation so that they are fixed relative to the bins positioned thereabove. A gap or space is provided between the lower portion of the bin and the rotary feeder solids inlet to take up the vertical movement of the bin relative to the rotary feeder during vertical movement of the bin under conditions of changing load on the weigh cells. This provides a means to determine the efficiency of the respective rotary feeders.

It has been discovered by positioning a flexible seal between the bottom of each bin and the top of each feeder that the desired relative vertical movement is obtained between the rotary feeder and the vertically movable bins without the particulate material spilling out from between the bottom of each bin and each rotary feeder. It has been further discovered by using a flexible seal having a desired configuration that the back pressure in the bin may now be exhausted or bled off around the flexible seal. By a suitable means such as regulating the tension of the flexible seal between the bottom of the bin and the top of the rotary feeder a variable air bleed may be provided so that it is now possible to tolerate greater air leakage in the rotary feeder and thereby increase the length of time that a rotary feeder can be operated before it must be repaired or replaced.

Briefly, the invention comprises a system and apparatus for feeding particulate material by gravity from a vertically movable overhead bin to a fixed rotary feeder. An air bleed in the form of a flexible seal is provided between the lower portion of the bin and the rotary feeder solids inlet. The flexible seal serves as a means to bleed off air from the rotary feeder through the solids inlet into the lower portion of the bin. The flexible seal also permits vertical movement of the bin relative to the fixed rotary feeder without the particulate material spilling out between the bottom of the bin and the top of the rotary feeder.

Accordingly, an object of this invention is to provide a new and improved solids flow system for feeding particulate material to a pressurized transporting device.

Another object of this invention is to provide an air bleed for exhausting air flowing from the rotary feeder into a feed bin positioned thereabove.

Another object of this invention is to provide a flexible seal between a fixed rotary feeder and a relatively movable feed bin.

These and other objects and advantages of this invention will be more completely disclosed and described in the following specification, the accompanying drawings, and the appended claims.

In the drawings:

FIGURE 1 is an elevational flow diagram of a suitable system for injecting particulate material into the tuyere zone of a blast furnace.

FIGURE 2 is an elevational view of the lower portion of a feed bin partially in section illustrating the double conical member positioned therein.

FIGURE 4 is a view taken along the line 4—4 in FIGURE 3 illustrating the seal frame and flexible seal between the bin outlet and the rotary feeder inlet in partial section.

Figure 5:
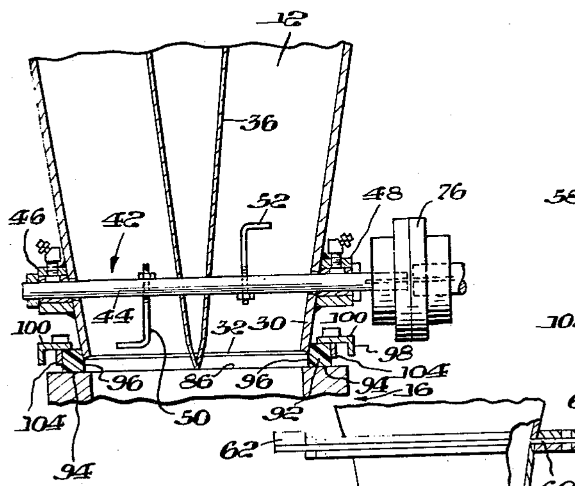
FIGURE 5 is a view in section taken along the lines 5—5 of FIGURE 4.

Referring to the drawings and particularly to FIGURE 1, there is shown a storage bin 10 which receives particulate material from a suitable source. Depending from and secured to the storage bin 10 are a plurality of feed bins 12. The storage bin 10 and feed bins 12 are supported by weigh or load cells diagrammatically illustrated at 14. The cells 14 are arranged to determine periodically the rate of removal of the particulate material from storage bin 10 through respective feed bins 12 to determine the efficiency of the rotary feeders, as will be later explained. The storage bin 10 and depending feed bins 12 move upwardly a predetermined distance as the particulate material is removed from the storage bin 10 through the feed bins 12.

The lower portions of the feed bins 12 are in overlying relation with the coal inlet of the rotary feeders 16. Air under pressure is supplied to all of the rotary feeders 16 through a common header 18 and branch conduits 20. Particulate material is discharged from the rotary feeder 16 as a fluidized mass and flows through conduit 22 to the tuyere zone of a blast furnace generally designated by the numeral 24, where it is injected into the blast furnace 24.

The above system is described in greater detail in copending application Serial No. 231,079, now Patent No. 3,178,164 assigned to the assignee of the present invention.

The lower portion of one of the feed bins 12 is illustrated in detail in FIGURE 2 and includes a cylindrical shell portion 26 and a lower inwardly tapered shell portion 30. The bottom of the inwardly tapered shell portion 30 forms a rectangular opening 32 which is positioned over a solids inlet opening to the rotary feeder 16. The shape of the opening 32 in the bottom of feed bin 12 is illustrated in FIGURE 4. Coaxially positioned within the cylindrical portion 26 is an upright conical member 34. An inverted cone 36 is coaxially positioned in the tapered portion 30 with the base portions of the respective cones 34 and 36 connected to each other at 38. Suitable structural members 40 fixedly position the cones 34 and 36 within the lower portion of feed bin 12. The manner in which the cones 34 and 36 inhibit bridging and holdup of particulate material within the feed bin 12 is described in detail in U.S. Patent No. 3,081,009.

Figure 6:
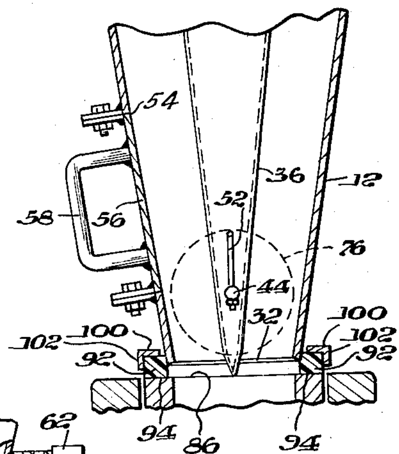
FIGURE 6 is a view in section taken along the lines 6—6 of FIGURE 4.

A mechanical agitator generally designated by the numeral 42 is positioned in the lower portion of the feed bin 12 and is illustrated in FIGURES 5 and 6. The mechanical agitator 42 includes a rod 44 rotatably positioned in supports 46 and 48 secured to opposite sides of the feed bin lower shell portion 30. The rod 34 extends through suitable apertures in the upright cone 36 positioned within the bin lower shell 30. Agitator pins 50 and 52 extend radially from the rod 44 between the shell 30 and the lower cone 36. Suitable means, later described, rotates the rod 44 in the supports 46 and 48 to revolve the pins 50 and 52 and dislodge the particulate material in the lower tapered shell 30. The lower tapered shell 30 has an inspection opening 54 therein which is suitably enclosed by a door 56 having a handle portion 58. The lower shell 30 also has suitable horizontal slots 60 therein to receive slide plates 62 that serve to close the opening in the shell portion 30 and serve as a gate for stopping the flow through the shell portion 30.

Figure 3:
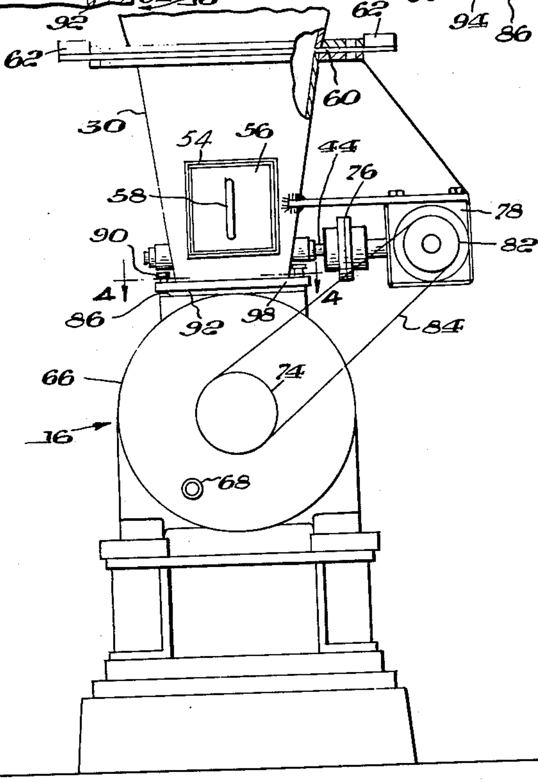
FIGURE 3 is an enlarged view in side elevation of one of the rotary feeders with the bottom portion of a feed bin in overlying relation with the rotary feeder solids inlet.

The rotary feeder 16 is illustrated in elevation in FIGURE 3 and in plan in FIGURE 4. The air inlet branch conduit 20 supplies air under pressure to the feeder housing 66 and a solids air admixture is discharged through the outlet conduit 68 that is axially aligned with the air inlet conduit 20. Particulate material is fed by gravity from the feed bin 12 into the solids inlet opening 64. A rotor that has peripheral recesses or compartments (not shown) is positioned within the rotary feeder housing 66. The rotor peripheral compartments pick up a quantity of solid particles at the solids inlet 64 and upon rotation the compartments communicate with the aligned conduits 20 and 68 whereupon the air supplied through conduit 20 ejects the particulate material from the rotor compartments as a fluidized mass into outlet conduit 68.

The rotor is driven by a motor 70 through a flexible coupling 72. A sprocket 74 is connected to the rotor shaft and is arranged to drive the agitator 42. The agitator shaft 44 is connected through a coupling 76 to a gear box 78. The gear box 78 has a shaft 80 extending laterally therefrom with a sprocket 82 nonrotatably connected thereto. A drive chain 84 drivingly connects the sprocket 72 on the rotary feeder rotor shaft to the sprocket 82 to thus provide a drive from the rotor motor 70 for the agitator 42. The feeder housing 66 has a planar top surface 86 (FIGURE 4) with a plurality of threaded bores 88 arranged to receive bolts 90. The bores 88 are arranged about the rectangular solids inlet or opening 64.

As is illustrated in FIGURES 5 and 6 the feed bin lower end portion 32 is spaced above the top surface of the rotary feeder 16. A rectangular seal 92 surrounds the outer surface of the feed bin shell 30 and forms a seal between the feed bin lower portion 32 and the feeder solids inlet 64. The seal is preferably fabricated from a closed cell neoprene sponge, as for example, material called "Rubatex," manufactured by the Great American Industries, Bedford, Virginia.

The seal 92 has a bottom wall 94 in abutting relation with the feeder top surface 86 and an inner side wall 96 in sealing relation with the feed bin shell 30. A rectangular frame generally designated by the numeral 98 maintains the seal 92 in sealing relation with the feed bin 12 and the rotary feeder 16. The frame 98 has a top portion 100 and a depending side portion 102. The top portion 100 has its inner edge spaced from the feed bin shell 30 and is in overlying relation with the upper surface of the rectangular seal 92. The frame depending side portions 102 are in abutting relation with the seal outer side wall. The short side of the frame 98 has an inner depending member 104 which conforms the rectangular seal to the external shape of the bin lower shell 30. The frame top portion 100 has a plurality of apertures aligned with the bores 88 in the feeder top surface 86 and bolts 90 extend through these apertures in frame 98 and into the threaded bores 88. With this arrangement the seal 92 is adjustable in that the bolts 90 may be tightened to move the frame 98 downwardly toward the feeder upper surface 86. This downward movement of the frame 98 compresses the seal 92 between the frame 98 and the rotary feeder upper surface 86. The compression of the sponge-like seal increases the sealing force between the seal inner side wall 96 and the bin external surface adjacent the bin lower opening 32. Thus by adjusting the bolts 90 the seal between the feed bin 12 and the rotary feeder 16 may be adjusted to provide the desired air bleed for the air leaking through the solids feed inlet in rotary feeder 16.

By positioning the resilient seal 92 around the external surface of the bin lower portion it is now possible to bleed off the air that flows through the solids inlet into the lower portion of the bin 12. The bleed can be adjusted by adjusting the compressive force on the seal 92. The flexible seal 92 permits the vertical movement of the bin 12 without interfering with the operation of the weigh cells 14. It is now possible to tolerate greater air back-flow in the respective rotary feeders and thus increase the length of time that the rotary feeder can be operated before it must be repaired or replaced.

According to the provisions of the patent statutes, the principle, preferred construction, and mode of operation of the invention have been explained and what is now considered to represent its best embodiment has been illustrated and described. However, it should be understood that, within the scope of the appended claims, the invention may be practiced otherwise than as specifically illustrated and described.

I claim:

1. Apparatus for transporting particulate material as a fluidized mass through a conduit comprising a bin for said particulate material, a feeder device operable to periodically introduce selected quantities of said particulate material from said bin into an air stream, a source of air under pressure, conduit means to convey said air to said feeder device and to convey said particulate material and said air as a fluidized mass from said feeder device, said feeder device having a solids inlet for said particulate material, said bin positioned in overlying relation to said feeder device and having an outlet opening spaced from said feeder device solids inlet, said bin outlet opening arranged to move vertically toward and away from said feeder device inlet opening, and a flexible seal positioned between said bin outlet opening and said feeder device inlet opening, said flexible seal constructed and arranged to permit air passing through said feeder device solids inlet into said bin outlet opening to pass around said seal so that said particulate material is free to flow by gravity from said bin outlet into said feeder device solids inlet opening.

2. Apparatus for transporting particulate material as a fluidized mass through a conduit as set forth in claim 1 in which said bin includes a cylindrical shell intermediate portion and a downwardly tapered lower shell portion, and a pair of conical members coaxially positioned in said shell with the lower conically shaped portion being inverted and the respective bases of said conical members coinciding, said bin lower shell portion having a rectangular opening through which said particulate material flows by gravity into said feeder device solids inlet.

3. Apparatus for transporting particulate material as a fluidized mass through a conduit as set forth in claim 1 in which said bin includes a cylindrical shell intermediate portion and a downwardly tapered lower shell portion, a pair of conical members coaxially positioned in said shell with the lower conically shaped portion being inverted and the respective bases of said conical members coinciding, said bin lower shell portion having a rectangular opening through which said particulate material flows by gravity into said feeder device solids inlet, an agitator device positioned in said bin lower shell portion adjacent said outlet opening, said agitator device including a shaft extending substantially horizontally through said shell and said inverted conical member, means rotatably supporting said shaft and a plurality of rods extending radially from said shaft between said shell and said inverted conical member, and drive means to rotate said shaft in said supporting means to revolve said rods in said bin lower shell.

4. Apparatus for transporting particulate material as a fluidized mass through a conduit comprising, a bin for said particulate material having a downwardly tapered lower portion, a feeder device operable to periodically introduce selected quantities of particulate material from said bin into an air stream, a source of air under pressure, conduit means to convey said air to said feeder device and to convey said particulate material and said air as a fluidized mass from said feeder device, said feeder device having a top planar surface with a solids inlet for said particulate material, said bin positioned in overlying relation to said feeder device and having a rectangular outlet opening spaced from said feeder device solids inlet, said bin outlet opening arranged to move vertically toward and away from said feeder device inlet opening, a rectangular flexible seal having a bottom wall and an inner wall, said seal bottom wall positioned in sealing relation with said feeder device planar top surface, said seal inner wall positioned in sealing relation with said bin downwardly tapered lower portion adjacent said bin discharge opening, a rectangular seal frame positioned in overlying relation with said seal, said seal frame having a top portion in overlying relation with said seal top surface and depending side portions in abutting relation with said seal outer side walls, means to move said seal frame vertically toward and away from said feeder device planar top surface to thereby increase or decrease the sealing force between said bin and said feeder device, and said flexible seal constructed and arranged to permit air passing through said feeder device solids inlet into said bin outlet opening to pass around said seal so that said particulate material is free to flow by gravity from said bin outlet into said feeder device solids inlet opening.

References Cited by the Examiner

UNITED STATES PATENTS

| | | | |
|---|---|---|---|
| 2,489,925 | 11/49 | Omwake | 302—49 |
| 2,565,546 | 8/51 | Colburn | 302—49 |
| 2,757,049 | 7/56 | Temple | 302—49 |
| 2,960,245 | 11/60 | Knapp | 302—49 |
| 3,081,009 | 3/63 | Cooper | 222—459 |

SAMUEL F. COLEMAN, *Primary Examiner.*

ANDRES H. NIELSEN, *Examiner.*